United States Patent [19]
Rubenstein
[11] 3,710,321
[45] Jan. 9, 1973

[54] MACHINE RECOGNITION OF LEXICAL SYMBOLS

[75] Inventor: David A. Rubenstein, Rochester, Minn.
[73] Assignee: International Business Machines Corporation, Armonk, N.Y.

[22] Filed: Jan. 18, 1971
[21] Appl. No.: 106,971

[52] U.S. Cl. ..........................340/146.3, 340/146.3 Z
[51] Int. Cl. ..........................G06k 9/12
[58] Field of Search ..........................340/146.3

[56] References Cited

UNITED STATES PATENTS

| | | | |
|---|---|---|---|
| 3,182,290 | 5/1965 | Rabinow | 340/146.3 AQ |
| 3,283,303 | 11/1966 | Cerf | 340/146.3 Z |
| 3,460,091 | 8/1969 | McCarthy | 340/146.3 AH |

*Primary Examiner*—Maynard R. Wilbur
*Assistant Examiner*—William W. Cochran
*Attorney*—Hanifin and Jancin and A. Michael Anglin

[57] ABSTRACT

A raster scan covers areas containing major characters of an alphabet. When a character is recognized as being one which may have an associated diacritical mark, the scan is shifted to a separate area, the contents of which are recognized from among a group of such marks. The major-character recognition unit is disabled during scanning of the diacritical marks, and vice versa. The areas may be defined on a document by rows of rectangular boxes.

15 Claims, 5 Drawing Figures

INVENTOR.
DAVID A. RUBENSTEIN
BY [signature]
ATTORNEY

MACHINE RECOGNITION OF LEXICAL SYMBOLS

BACKGROUND OF THE INVENTION

The present invention concerns systems and means for recognizing lexical symbols and is particularly directed toward the machine recognition of alphabets having auxiliary or diacritical marks.

The written form of many of the world's languages employs the basic Roman alphabet and a number of special signs or diacritical marks for varying the pronounciation or meaning of certain of the letters. The machine recognition of many of these languages requires that such marks be taken into account.

In conventional recognition systems, diacritical marks are frequently ignored by the machine. When they are recognized, they are considered to be an integral part of the character itself; this requires, for instance that one recognition logic be designed for a character "A," and a separate logic for the character "Á," This approach also leads to a number of rejects and substituted characters since the diacritical mark often is confused with a portion of the main character, thus changing its appearance to the recognition circuit. It also frequently occurs that a noise blob or smudge in the vicinity of the character is mistaken for a diacritical mark.

SUMMARY OF THE INVENTION

In the system of the present invention, a scanner traverses a document having a plurality of areas for containing patterns classifiable into a plurality of categories, such as characters of an alphabet. THe areas are of two types: a first type contains the "major" symbols of the alphabet, while the second type contains the "auxiliary" symbols. The major symbols may represent any predetermined set of characters in a group or alphabet, such as Roman letters, numbers, punctuation marks or special symbols, or even a blank space. The set of auxiliary symbols may comprise, for instance, diacritical marks belonging to a specific language, special symbols, or any other set of marks which may be associable with particular ones of the major characters.

Recognition is enhanced according to the invention by making areas of the second type disjoint or non-overlapping with respect to those of the first type. The areas are preferably defined by sets of preprinted guidelines or other boundaries on the input document. Where such boundaries are employed, a first plurality defines a row of central area for receiving the major characters and a second plurality defines an adjacent row of substantially smaller area for receiving the auxiliary symbols.

A first recognition unit then identifies the contents of the first or central area as being certain major characters or symbols of the alphabet, while a second recognition means identifies the contents of the second or auxiliary areas with respect to at least one predefined set of auxiliary symbols associable with respective ones of the major characters. The second recognition unit is preferably enabled only when the associated major character is a member of a predetermined subset of the characters of the alphabet. Additionally, the scanner may be made to scan the central areas and to scan associated auxiliary areas only when the associated major character is identified as a member of the predetermined subset.

Accordingly, it is an object of the present invention to advance the state of the optical scanning, character recognition and related arts by providing an improved character recognition system and apparatus.

It is also an object of the invention to provide a recognition system which is extremely versatile and flexible in that it may be easily and inexpensively adapted to read symbols in a number of different languages without extensive changes.

It is another object to provide input documents for enhancing the capabilities of such a system.

Further objects and advantages of the invention, as well as modifications obvious to those skilled in the applicable arts, will become apparent from the following detailed description, taken in conjunction with the accompanying drawings.

DETAILED DESCRIPTION

Figure 1:
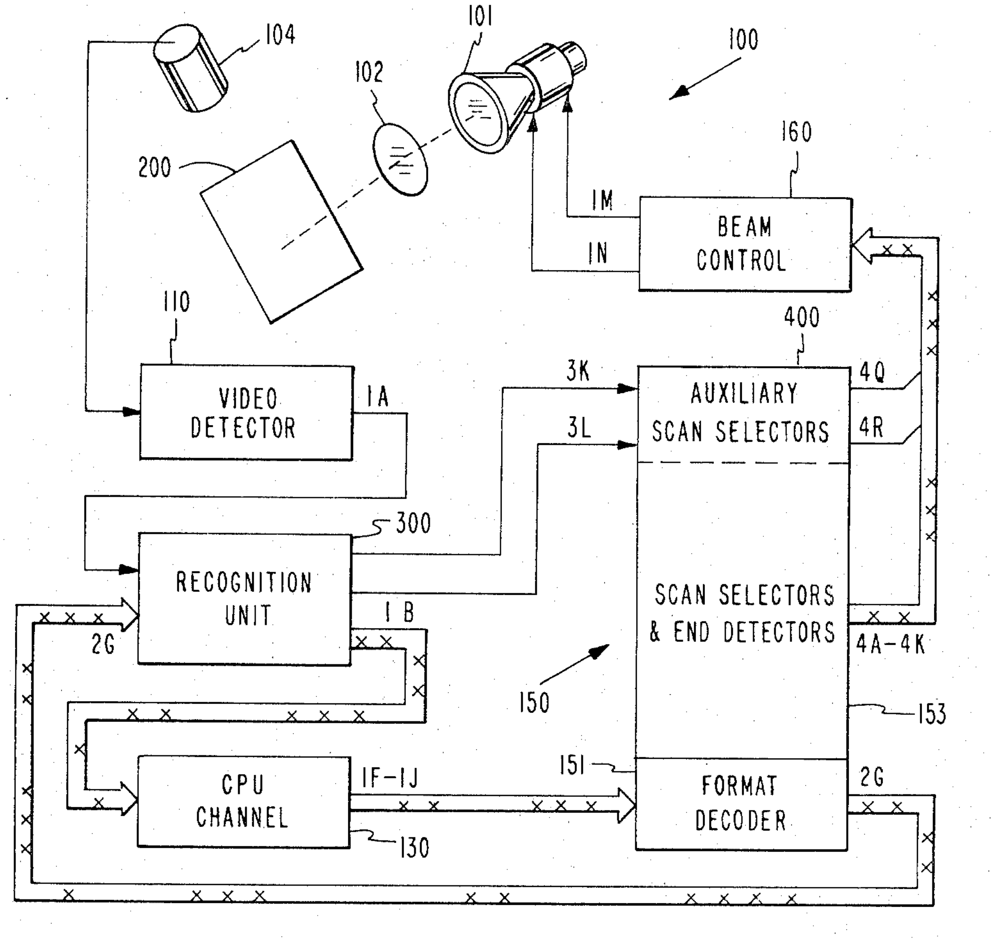
FIG. 1 is a schematic diagram of an optical character recognition system embodying the invention.

Referring more particularly to FIG. 1, the reference numeral 100 denotes generally a character recognition system in which a scanning beam generated by a cathode-ray tube (CRT) 101 is focused through an optical system 102 onto a document 200. A photo-multiplier tube (PMT) or other photo-detector 104 collects diffuse reflected light from the document and converts it into an electrical signal for a video detector 110, where it is digitized in both time and amplitude. The signal from detector 110 proceeds through line 1A to recognition unit 300 for analysis. Digital codes corresponding to the recognized characters then proceed on line 1B to a central processing unit (CUP) channel, or data processor, 130.

Channel 130 in turn transmits digital data on lines 1F–1J to format decoder 151 of control apparatus 150. Conventional decoder 151 provides signals on line 2G for controlling the mode of operation of recognition unit 300, as will be more fully described hereinafter. Decoder 151 also provides scan-control signals to conventional scan selectors 153. Selectors 153 in turn provide control signals to auxiliary scan selectors 400. Lines 4A–4K, 4Q and 4R carry various scan-selection signals to beam control unit 160, which in turn provides deflection signals on lines 1M and 1N to CRT 101.

The conventional portions of the system of FIG. 1 are more fully described in commonly owned U. S. Pat. application Ser. No. 829,397, filed June 2, 1960, by D. L. Johnston and P. E. Nelson. The present invention however, is also useful with recognition systems other than the particular example shown in FIG. 1.

Figures 2A, 2B:
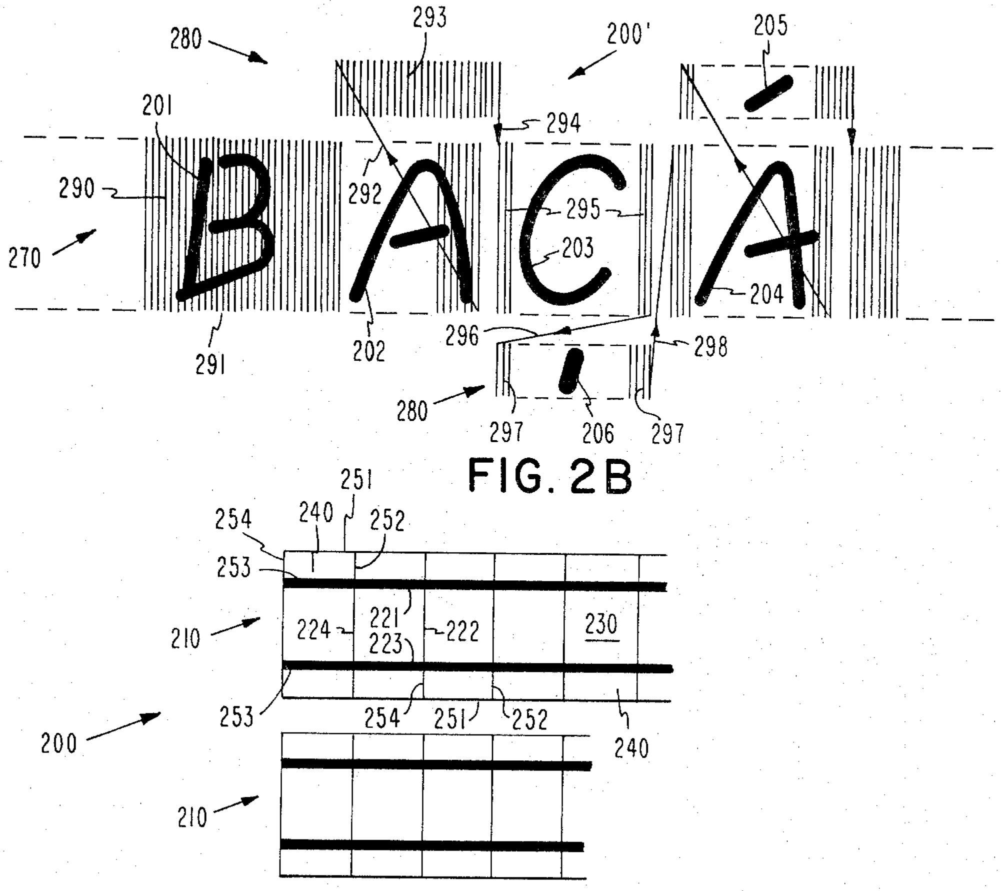
FIGS. 2A and 2B illustrate portions of input documents useful with the system of FIG. 1, and further shows a scanning pattern, according to the invention.

FIG. 2A shows an enlarged portion of a document 200 having distinct rows of fields 210 for receiving handwritten characters. Each field 210 contains a first plurality of boundaries 221–224 defining a number of central areas 230 for receiving the major characters of the alphabet to be recognized. Each row 210 extends in a horizontal direction and the rows 210 are disposed vertically with respect to each other on document 200. As may be seen, boundaries 221–224 form a substantially rectangular box of convenient size. Associated with each central area 230 is at least one auxiliary area 240, defined by a second plurality of boundaries 251–254. Each auxiliary area 240 is associated with one central area 230, although each central area 230 may be associated with more than one auxiliary area 240. Where the language to be recognized contains both superior and inferior diacritical marks, areas 240 are located above and below areas 230, the areas 240 being separated fro each other by areas 230. It should be noted that areas 240 are completely separate and disjoint, although the two types of areas 230 and 240 are located adjacent to one another. They may, in fact, be located contiguously, so that the boundaries 253 of the second plurality are common with the boundaries 221 and 223 of the first plurality.

Each are 230 may have boundaries 222 and 224 in common with other areas 230; similarly, each area 240 may have boundaries 252 and 254 in common with further ones of the areas 240. In accordance with conventional practice, boundaries 221–224 and 251–254 are preferably invisible to recognition unit 300. This effect may be accomplished by printing the boundaries in an ink which is invisible to photodetector 104, FIG. 1. It may also be accomplished by printing the boundaries as a series of small elements (such as dots) which give the visual impression of lines, but which are filtered out as "noise" by video detector 110 or by recognition unit 300. That is, the term "boundary," as used herein, is to be taken as one or more elements which have the visual effect of separating one area from another. Moreover, it may be preferable in some applications to form the areas 230 and/or 240 in other than rectangular shapes. Boundaries 221–224 and 251–254 may, for instance, define other types of parallelograms, such as rhomboids.

FIG. 2B shows a row of letters 201–204 and associated diacritical marks 205, 206 upon a document 200' in which central area 270 and auxiliary areas 280 are defined by a scan pattern 290 rather than by preprinted guidelines. Details of scan 290 will be discussed in connection with FIG. 4.

Figure 3:
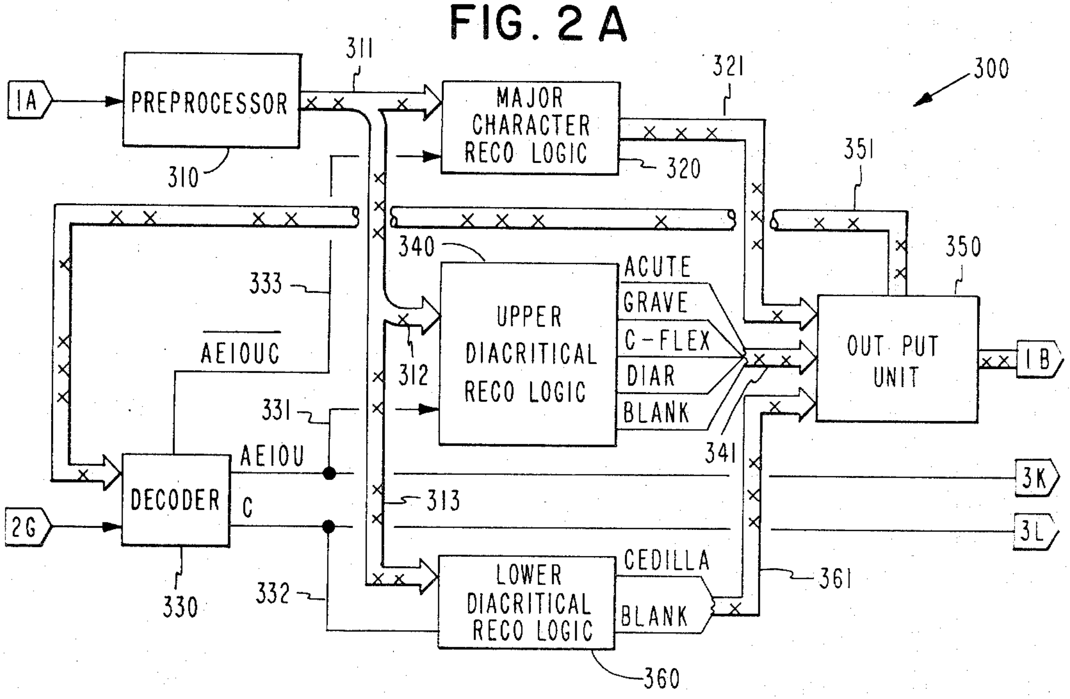
FIG. 3 is a schematic diagram of the recognition unit of FIG. 1.

Referring now to FIG. 3, conventional preprocessor 310 of recognition unit 300 transmits signals corresponding to the presence or absence of predetermined features of an input character on lines 311–313. Preprocessor 310 may perform the conventional functions of pattern storage registration, segmentation and feature extraction. Conventional recognition logic 320 processes the feature signals on line 311 to produce an identification code on line 321 which is indicative of the major characters contained in central areas 230 or 270. Line 321 also transmits the identifiying code, via line 351, to a decoder 330, which is enabled by signal on line 2G when format decoder 151 has detected a command from CPU channel 130 that the alphabet to be recognized may contain diacritical marks or other auxiliary symbols.

In the example to be described the Roman letters "A," "E," "I," "O" and "U" comprise a first subset of the alphabet; this subset may have one of a predetermined group of superior diacritical marks located thereabove. A second subset, comprising the single letter "C," may have an inferior diacritical mark located therebelow. When one of the characters in the first subset has been recognized by logic 320, decoder 330 transmits a signal on line 331 for energizing recognition unit 340. Logic 340 may be relatively rudimentary in form, since it need recognize only those symbols contained in the set of the accents acute, grave and circumflex, the diaresis (or double dot), and a blank space. A code corresponding to the recognized symbol of this set is then transmitted to output unit 350 on line 341. Similarly, the single letter "C" forms another subset of the alphabet, since it may have a cedilla located in an auxiliary space therebelow. For this second subset, line 332 from decoder 330 provides a signal for enabling diacritical recognition logic 360. Logic 360 may be even simpler than logic 340, since it need only differentiate between the cedilla and a blank space. Its identification code is transmitted on line 361 to output unit 350. Deconder 330 may also provide a signal on line 333 whenever a character in either of the subsets is recognized. This signal disables recognition logic 320 for either of the two subsets (or, equivalently, enables it under the opposite condition), so that logic 320 cannot confuse one of the diacritical marks with any of the major characters.

Output unit 350 may be a conventional buffer storage for holding identification codes on any of the lines 321, 341 and 361, and for transmitting these codes to CPU channel 130 over line 1B. If, on the other hand, it is desired that a first identification code be transmitted for a letter not having a certain diacritical mark, and a different code be transmitted for the same letter with a specific diacritical mark, then output unit 350 may include a code modifier or translator for modifying the code on line 321 in accordance with a code on line 341 or 361. Units for performing this function are also well known in the art.

Figure 4:
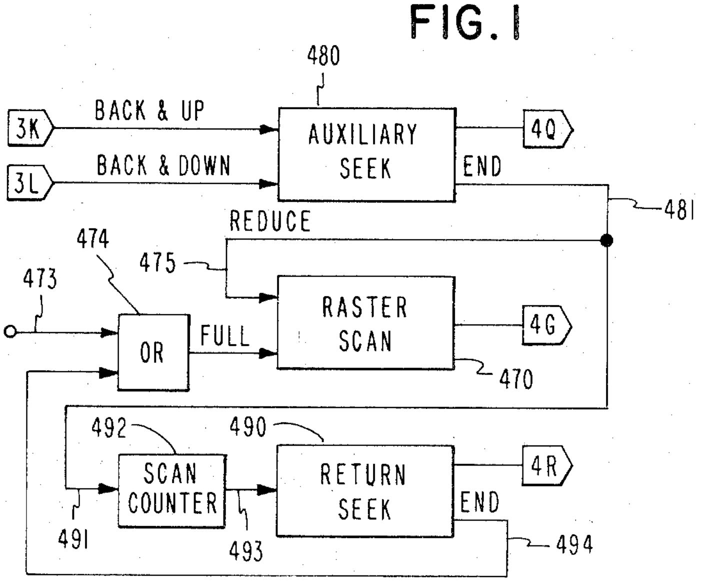
FIG. 4 show the auxiliary scan selectors of FIG. 1.

FIG. 4 shows the auxiliary scan selectors 400 for executing a scanning path such as that shown at 290, FIG. 2B. Scan pattern 290 is also preferably employed with a document having preprinted guidelines such as those shown in FIG. 2A. In an initial portion 291 of pattern 290, scan selectors 153 cause CRT 101 to execute a vertical raster scan over the central areas 270. A conventional signal on line 473, passed through OR gate 474, enables raster-scan generator 470 to produce signals on line 4G to control this scan. (Line 4G is included in the cable 4A–4K shown in FIG. 1.) The conditions under which conventional signals 473 may be generated are shown in more detail in the aforementioned patent application Ser. No. 829,397. Raster portion 291 continues through the characters 201 and 202, FIG. 2B.

When character 202 is recognized as being a member of the subset of letters which may contain a superior diacritical mark, however, the previously mentioned signal on line 331 is transmitted on line 3K to seek generator 480 to produce a signal on line 4Q causing beam control 160 to move the scanning beam back and upward along line 292 to the upper auxiliary area 280 associated with character 202. When a signal on line 481 indicates that scan line 292 has reached its destination, input line 475 causes raster generator 470 to produce signals on line 4G to move the scanning beam in a reduced-size raster 293. The seek-end signal on line 481 is also transmitted to an enabling input 491 of a scan counter 492. Then, when reduced raster 293 reaches the end of auxiliary area 280 after a predetermined number of scans, a signal on line 493 causes seek generator 490 to produce a signal on line 4R which in turn causes beam control 160 to move the scanning beam in a path 294 to the central area 270 for the next major character 203. When the beam has reached a predetermined position in central area 270, a signal on line 494 causes raster generator 470 through OR gate 474 to again produce a full-size raster scan 295.

When seek generator 480 receives a signal on line 3L at the completion of scanning of the character 203, a similar sequence ensues. This time, however, seek scan 296 leads back and downward to the lower auxiliary area 280 for character 203, since it is a member of the second subset of the alphabet. The seek-end signal on line 481 then initiates a reduced raster scan 297 over the lower auxiliary area until generator 490 receives a signal on line 493. At this point, generator 490 produces a scanning path 298 to the central area 270 for the next character 204. A seek-end signal on line 494 then energizes raster generator 470 as previously described, and the scan cycle repeats itself.

In summary, auxiliary scan selectors 400 cause the scanning beam to traverse the row of central areas 270 on document 200. Whenever recognition unit 300 identifies a character belonging to one or more groups or subsets of the alphabet which may contain diacritical marks, signals on line 3K or 3L cause scan control 150 to interrupt its normal sequence and to scan the appropriate auxiliary areas 280 for the presence of a mark. Within recognition unit 300, the diacritical logics 340 and 360 are inhibited during scanning of the central areas 270, while logic 320 is inhibited during the scanning of the auxiliary areas 280; in this way, no confusion can result between the set of major characters and the set of diacritical marks or other auxiliary symbols. The scan pattern 290 conserves total scanning time, since only those auxiliary areas which might possibly contain a diacritical mark are scanned. Other types of scan patterns for achieving similar results may also be visualized. A scanning beam may, for instance, traverse the entire row of central areas while the recognition unit 300 records the positions of all major characters in the row which may have a diacritical mark associated therewith. The scanning beam may then return to the beginning of the row and scan only those auxiliary areas 280 corresponding to the major characters whose position have been recorded. It would also be possible to extend the concepts of the above described scan pattern to other types of scanners, such as linear-array scanners (not shown). Other variations within the scope and spirit of the invention will also suggest themselves to those skilled in the applicable arts.

Having described a preferred embodiment thereof, I claim as my invention:

1. A system for recognizing lexical symbols, comprising:
- means for scanning a document having a plurality of areas;
- first recognition means for identifying the contents of a first of said areas as being a major symbol representing one character of an alphabet;
- second recognition means for identifying the contents of a second of said areas with respect to a set of auxiliary symbols associable with particular ones of said characters, said second area being disjoint from said first area;
- means responsive to said first recognition means for enabling said second recognition means when said one character is a member of a predetermined subset of said alphabet; and
- output means responsive to both said first and said second recognition means for transmitting to a utilization means a first code representing said one character, and for selectively transmitting to said utilization device a second code when said second recognition means has been enabled.

2. The system of claim 1, wherein said second area is adjacent said first area.

3. The system of claim 2 wherein said set of auxiliary symbols is a predetermined group of diacritical marks for characters in said predetermined subset.

4. The system of claim 1, further comprising third recognition means for identifying the contents of a third of said areas with respect to a further set of auxiliary symbols associable with particular ones of said characters; and wherein said enabling means is further responsive to said first recognition means for enabling said third recognition means when said one character is a member of a further predetermined subset of said alphabet.

5. The system of clalm 4, wherein said second and third areas are adjacent said first area, and are separated from each other by said first area.

6. The system of claim 1, wherein said scanning means is responsive to said first recognition means for scanning said second area only when said one character is a member of said predetermined subset.

7. The system of claim 1, wherein said output means is operative to transmit both said first and second codes sequentially to said utilization device.

8. The system of claim 7, wherein said first code represents an unmodified form of said one character, and wherein said second code represents one of said auxiliary symbols.

9. The system of claim 1, wherein said second code represents a modified form of said one character.

10. The system of claim 9, wherein said modified form represents the combination of said one character and one of said auxiliary symbols associable therewith.

11. A system for recognizing a plurality of input patterns, comprising:
- means for executing a scan in a plurality of central areas of a field;
- first recognition means for classifying patterns in said central areas into respective ones of a first plurality of categories;
- means for detecting those of said patterns belonging to a predetermined group in said first plurality;
- means responsive to said detecting means for shifting s-aid scan to a plurality of auxiliary areas of said field corresponding to those of said central areas containing patterns belonging to said predetermined group;
- second recognition means for classifying the contents of said auxiliary areas into respective ones of a second plurality of categories; and means responsive to said detecting means for enabling said second recognition means during said shifted scan, wherein said enabling means is further responsive to said detecting means for inhibiting said first recognition means during said shifted scan.

12. The system of claim 11, wherein said areas are bounded by a plurality of lines preprinted on said field.

13. The system of claim 11, further comprising means responsive to said shifting means for returning said scan from said auxiliary areas to said central areas.

14. The system of claim 13, wherein said scan in said central areas is a raster scan.

15. The system of claim 14, wherein said shifted scan is a raster scan across said auxiliary areas.

* * * * *